US012650809B2

(12) United States Patent
Schmit

(10) Patent No.: US 12,650,809 B2
(45) Date of Patent: Jun. 9, 2026

(54) MULTIPLE INPUT SERIAL ADDER

(71) Applicant: Google LLC, Mountain View, CA (US)

(72) Inventor: Herman Schmit, Marina, CA (US)

(73) Assignee: Google LLC, Mountain View, CA (US)

( * ) Notice: Subject to any disclaimer, the term of this patent is extended or adjusted under 35 U.S.C. 154(b) by 1027 days.

(21) Appl. No.: 17/742,514

(22) Filed: May 12, 2022

(65) Prior Publication Data

US 2023/0367549 A1 Nov. 16, 2023

(51) Int. Cl.
*G06F 7/501* (2006.01)
*G06F 7/504* (2006.01)

(52) U.S. Cl.
CPC .............. *G06F 7/501* (2013.01); *G06F 7/504* (2013.01)

(58) Field of Classification Search
CPC ........ G06F 7/5045; G06F 7/504; G06F 7/501; G06F 7/50; G06F 7/5057; G06F 7/507; G06F 7/57; G06F 7/575; G06F 2015/768; G06F 2207/4812; G06F 2207/4824
See application file for complete search history.

(56) References Cited

U.S. PATENT DOCUMENTS

| | | | |
|---|---|---|---|
| 3,299,261 A | | 1/1967 | Steigerwalt, Jr. |
| 3,395,271 A | | 7/1968 | Stewart |
| 5,150,321 A | * | 9/1992 | Keating ................ G06F 7/5275 |
| | | | 708/627 |
| 5,262,975 A | | 11/1993 | Ohki |

| | | | |
|---|---|---|---|
| 5,869,982 A | * | 2/1999 | Graf ................... H03K 19/1736 |
| | | | 326/46 |
| 10,069,486 B1 | * | 9/2018 | Devlin ................. H03K 3/0372 |
| 10,534,578 B1 | | 1/2020 | Narayanaswami |
| 11,138,292 B1 | | 10/2021 | Nair et al. |
| 2018/0129475 A1 | * | 5/2018 | Almagambetov ...... G06F 7/525 |
| 2019/0288688 A1 | * | 9/2019 | Gribok ...................... G06F 7/50 |
| 2019/0303103 A1 | * | 10/2019 | Hah .......................... G06F 7/523 |
| 2021/0099174 A1 | * | 4/2021 | Metzgen ................... G06F 1/03 |

FOREIGN PATENT DOCUMENTS

| | | |
|---|---|---|
| CN | 101140511 A | 3/2008 |
| CN | 103235710 A | 8/2013 |
| CN | 105940372 A | 9/2016 |
| CN | 111506528 A | 8/2020 |
| DE | 1197650 B | 7/1965 |
| FR | 1516037 A | 3/1968 |

(Continued)

OTHER PUBLICATIONS

C. Doss, "Front-End PPA Architecture for Three Input Multiplier", Nov. 2006. (Year: 2006).*

(Continued)

*Primary Examiner* — James Trujillo
*Assistant Examiner* — Maria De Jesus Rivera
(74) *Attorney, Agent, or Firm* — Lerner David LLP

(57) ABSTRACT

Implementations for a functional unit are provided, wherein the functional unit can accumulate more than two serial inputs and provide one serial summation output. The serial inputs and outputs can be single bits or multiple bit busses. The functional unit can be implemented as a logical tree, where any two points are connected by one path. The functional unit can be incorporated into a processing unit of a programmable device to allow for construction of various functions.

20 Claims, 12 Drawing Sheets

(56) References Cited

FOREIGN PATENT DOCUMENTS

| GB | 0801053 | 4/2008 |
| JP | H0418809 A | 1/1992 |
| JP | H0546362 A | 2/1993 |

OTHER PUBLICATIONS

M. Manikanta et al., "Design and Implementation of Carry Tree Adders on FPGA", Dec. 2014. (Year: 2014).*
T. Memon et al., "POWER-area-performance characteristics of FPGA-based sigma-delta FIR filters", Mar. 2013. (Year: 2013).*
Albericio et al. Bit-Pragmatic Deep Neural Network Computing. Oct. 20, 2016. 12 pages. Retrieved from the Internet: <https://arxiv.org/abs/1610.06920>.
Denton et al. Direct Spatial Implementation of Sparse Matrix Multipliers for Reservoir Computing. Jan. 21, 2021, arXiv:2101.08884v1, pp. 1-12.
Ienne et al. Bit-Serial Multipliers and Squarers. Dec. 1994. IEEE Transactions on Computers, vol. 43, Issue. 12, pp. 1445-1450. Retrieved from the Internet: <https://ieeexplore.ieee.org/document/338107>.
Judd et al. Stripes: Bit-Serial Deep Neural Network Computing. 2016. IEEE. 12 pages. Retrieved from the Internet: <https://people.ece.ubc.ca/aamodt/publications/papers/stripes-final.pdf>.
Murray et al. Bit-Serial Neural Networks. 1988. Neural Information Processing Systems, D. Z. Anderson, Ed. American Institute of Physics, pp. 573-583. Retrieved from the Internet: <http://papers.nips.cc/paper/27-bit-serial-neural-networks.pdf>.
Sharma et al. Bit Fusion: Bit-Level Dynamically Composable Architecture for Accelerating Deep Neural Networks. Dec. 5, 2017. 13 pages. Retrieved from the Internet: <https://arxiv.org/abs/1712.01507v1>.

Umuroglu et al. BISMO: A Scalable Bit-Serial Matrix Multiplication Overlay for Reconfigurable Computing. Jun. 22, 2018. 8 pages. Retrieved from the Internet: <https://arxiv.org/abs/1806.08862>.
Anonymous. Adder (electronics)—Wikipedia. Apr. 30, 2022 (Apr. 30, 2022), 6 pages. Retrieved from the Internet: <https://en.wikipedia.org/w/index.php?title=Adder_(electronics)&oldid=1085442749>.
Denton et al. Direct Spatial Implementation of Sparse Matrix Multipliers for Reservoir Computing. arxiv.org, Cornell University Library, 201 Olin Library Cornell University Ithaca, NY 14853, Jan. 22, 2021 (Jan. 22, 2021), 12 pages.
Extended European Search Report for European Patent Application No. 22197378.7 dated May 25, 2023. 9 pages.
Nikolic et al. Global Is the New Local: FPGA Architecture at 5nm and Beyond. Practice and Experience in Advanced Research Computing, ACMPUB27, New York, NY, USA, Feb. 17, 2021 (Feb. 17, 2021), pp. 34-44.
Schmit et al. Multi-input Serial Adders for FPGA-like Computational Fabric. CHI Conference on Human Factors in Computing Systems, ACM, New York, NY, USA, Feb. 13, 2022 (Feb. 13, 2022), pp. 35-41.
Schmit. Multi-input Serial Adders for FPGA-like Computational Fabric—Supplemental Material—Proceedings of the 2022 ACM/SIGDA International Symposium on Field-Programmable Gate Arrays. Feb. 11, 2022 (Feb. 11, 2022), Bibiographic information document is 2 pages. Video can be viewed at the following link: <https://dl.acm.org/action/downloadSupplement?doi=10.1145%2F3490422.3502352&file=FPGA22-fpgasp153.mp4>.
Office Action for Chinese Patent Application No. 202211332009.3 dated Jul. 11, 2025. 11 pages.
Wang et al. Design and Implementation of a Full Adder. Feb. 5, 2013. English translation of abstract only. 4 pages.
Office Action for Chinese Patent Application No. 202211332009.3 dated Mar. 20, 2026. 5 pages.

* cited by examiner

MULTIPLE INPUT SERIAL ADDER

BACKGROUND

Mapping mathematical functions to programmable devices, such as field programmable gate arrays (FPGAs), can achieve great latency results. However, some programmable devices, such as the FPGAs, can be inefficient at implementing fundamental logic units, such as a serial adder. For example, a serial adder with two primary inputs can consume an entire 6-input lookup table (LUT) in an FPGA. As a result, the logic of the programmable device can be underutilized, and the routing of the programmable device can be overwhelmed by the number of nets required for circuit implementation.

BRIEF SUMMARY

Generally disclosed herein are implementations for a functional unit in a logic circuit that can accumulate more than two serial inputs and provide one serial summation output. The serial inputs and outputs can be single bits or multiple bit busses. The functional unit can be implemented as a logical tree, where any two points are connected by one path. The functional unit can be incorporated into a processing unit of a programmable device, such as a field programmable gate array (FPGA), to allow for construction of various mathematical functions, such as matrix multiplication.

An aspect of the disclosure provides for a programmable device including one or more processing units coupled to a programmable interconnect. The processing units include a plurality of full adder circuits configured to collectively receive at least three serial inputs and produce a single serial output that is a summation of the at least three serial inputs. A carried state is maintained among the plurality of full adder circuits.

In an example, a number of inputs of the processing units are equal to one more than the number of full adder circuits of the plurality. In another example, each serial input is a multiple bit input. In yet another example, each full adder circuit includes three single bit inputs, a sum output, and a carry output.

In yet another example, the sum output of a full adder circuit is an input of another full adder circuit. In yet another example, the carry output of a full adder circuit is retained in a register to be applied as a carry input of the full adder circuit in a subsequent cycle. In yet another example, the carry output of a full adder circuit is an input of another full adder circuit.

In yet another example, the programmable interconnect includes at least one of a plurality of logic gate or multiplexers. In yet another example, the programmable interconnect includes one or more registers.

Another aspect of the disclosure provides for a method for operating a processing unit of a programmable device. The processing unit includes a plurality of full adder circuits. The method includes collectively receiving, with the plurality of full adder circuits, at least three serial inputs; producing, with the plurality of full adder circuits, a single serial output that is a summation of the at least three serial inputs; and maintaining a carried state among the plurality of full adder circuits.

In an example, a number of inputs of the processing units are equal to one more than the number of full adder circuits of the plurality. In another example, each full adder circuit includes three single bit inputs, a sum output, and a carry output.

In yet another example, the method further includes inputting the sum output of a full adder circuit to another full adder circuit. In yet another example, the method further includes retaining the carry output of a full adder in a register to be applied as a carry input of the full adder circuit in a subsequent cycle. In yet another example, the method further includes inputting the carry output of a full adder circuit to another full adder circuit.

Yet another aspect of the disclosure provides for a non-transitory computer readable medium for storing instructions that, when executed by one or more programmable devices, causes the one or more programmable devices to perform operations including collectively receiving, with a plurality of full adder circuits, at least three serial inputs; producing, with the plurality of full adder circuits, a single serial output that is a summation of the at least three serial inputs; and maintaining a carried state among the plurality of full adder circuits.

In an example, the operations further include inputting a sum output of a full adder circuit to another full adder circuit. In another example, the operations further include retaining a carry output of a full adder in a register to be applied as a carry input of the full adder circuit in a subsequent cycle. In yet another example, the operations further include inputting a carry output of a full adder circuit to another full adder circuit.

In yet another example, the at least three serial inputs are collectively received based on a number of registers in a programmable interconnect.

DETAILED DESCRIPTION

Generally disclosed herein are implementations for a functional unit in a logic circuit that can accumulate more than two serial inputs and provide one serial summation output. The serial inputs and outputs can be single bits or multiple bit busses. The functional unit can be implemented as a logical tree, where any two points are connected by one path. The functional unit can be incorporated into a processing unit of a programmable device, such as a field programmable gate array (FPGA), to allow for construction of various mathematical functions, such as matrix multiplication.

Figure 1:
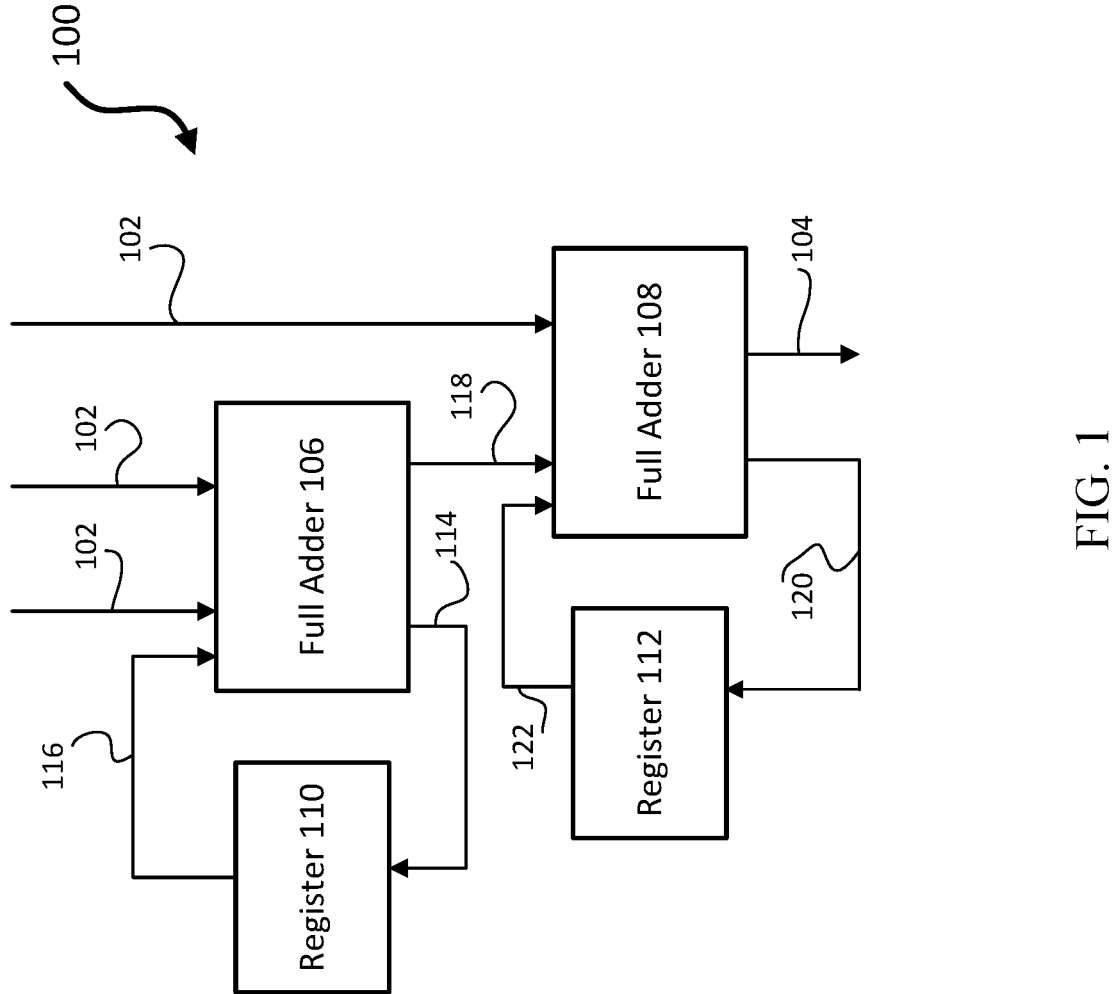
FIG. 1 depicts a block diagram of an example functional unit with three serial inputs and one serial output according to aspects of the disclosure.

FIG. 1 depicts a block diagram of an example functional unit 100 with three serial inputs 102 and one serial output 104. The functional unit 100 can include a first full adder 106, a second full adder 108, a first register 110, and a second register 112. Each full adder can include three inputs and two outputs. An input of the three inputs can be referred to as a carry input. Outputs can be a sum output and a carry output. The carry output can be retained in a register to be applied as the carry input to its respective adder in a subsequent summation cycle. The sum output can be a summation of the three inputs.

Two inputs of the first full adder 106 can be two of the three serial inputs 102 and an input of the second full adder 108 can be the third serial input 102. A carry output 114 of the first full adder 106 can be retained in the first register 110 to be applied as a carry input 116 of the first full adder 106 in a subsequent cycle. A sum output 118 of the first full adder 106 can be an input of the three inputs of the second full adder 108. A carry output 120 of the second full adder 108 can be retained in the second register 112 to be applied as a carry input 122 of the second full adder 108 in a subsequent cycle. A sum output of the second full adder 108 can be the serial output 104 that can output the summation of the three serial inputs 102.

Figure 2:
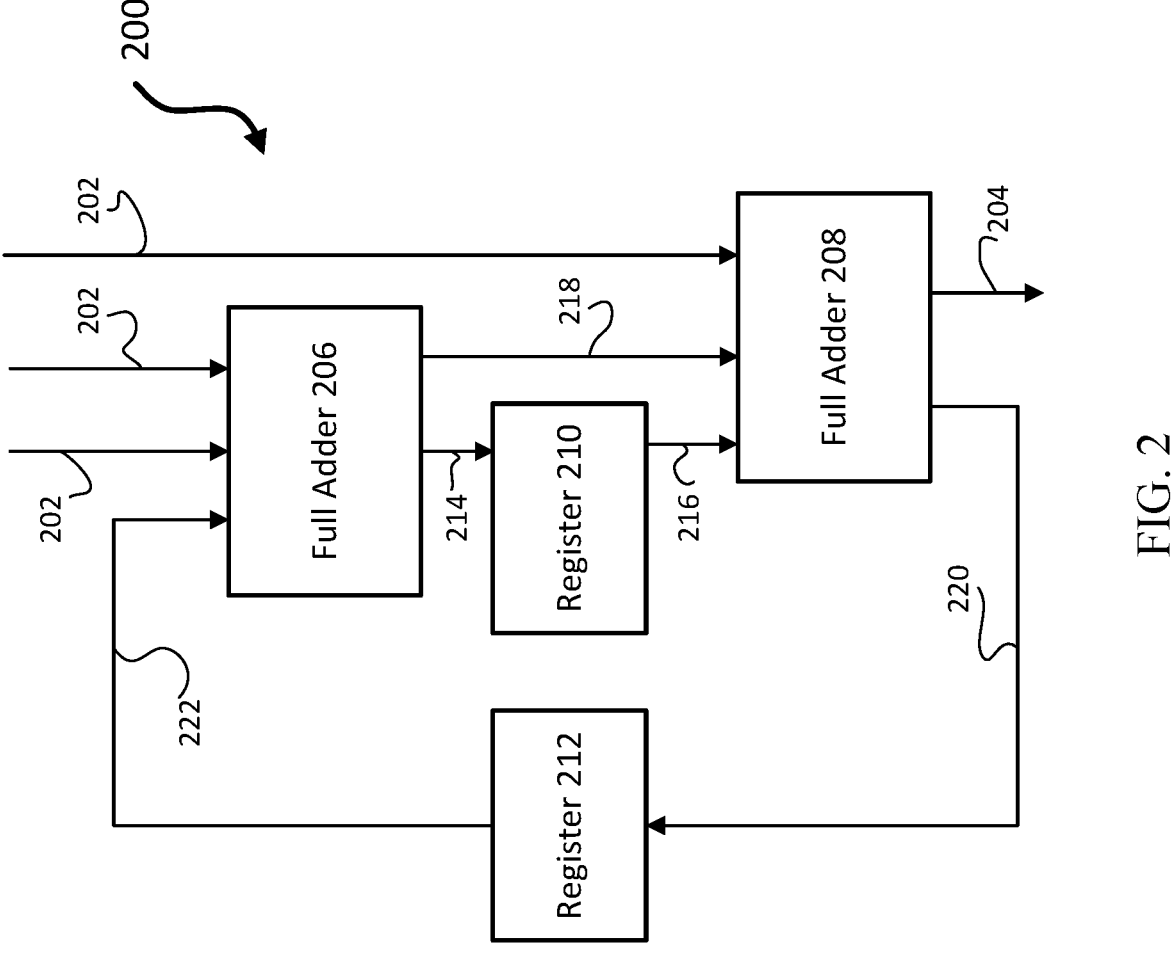
FIG. 2 depicts a block diagram of another example functional unit with three serial inputs and one serial output according to aspects of the disclosure.

FIG. 2 depicts a block diagram of another example functional unit 200 with three serial inputs 202 and one serial output 204. The functional unit 200 can include a first full adder 206, a second full adder 208, a first register 210, and a second register 212. The carry output of either full adder can be retained in a register to be applied as the carry input to the other full adder.

Two inputs of the first full adder 206 can be two of the three serial inputs 202 and an input of the second full adder 208 can be the third serial input 202. A carry output 214 of the first full adder 206 can be retained in the first register 210 to be applied as a carry input 216 to the second full adder 208 in a subsequent cycle. A sum output 218 of the first full adder 206 can be an input of the three inputs of the second full adder 208. A carry output 220 of the second full adder 208 can be retained in the second register 212 to be applied as a carry input 222 to the first full adder 208 in a subsequent cycle. A sum output of the second full adder 208 can be the serial output 204 that can output the summation of the three serial inputs 202.

A functional unit can include any number of serial inputs greater than two and one serial output. The number of full adders in the functional unit can be one less than the number of serial inputs. The number of registers in the functional unit can be less than the number of serial inputs. The functional unit can be a balanced tree or unbalanced tree of full adders such that a number of layers of full adders can be at most equal to the number of full adders in the functional unit. The following FIGS. 3-6 provide example functional units for four, five, and six serial inputs to further illustrate the concept and not to limit the disclosure to the examples shown.

Figure 3:
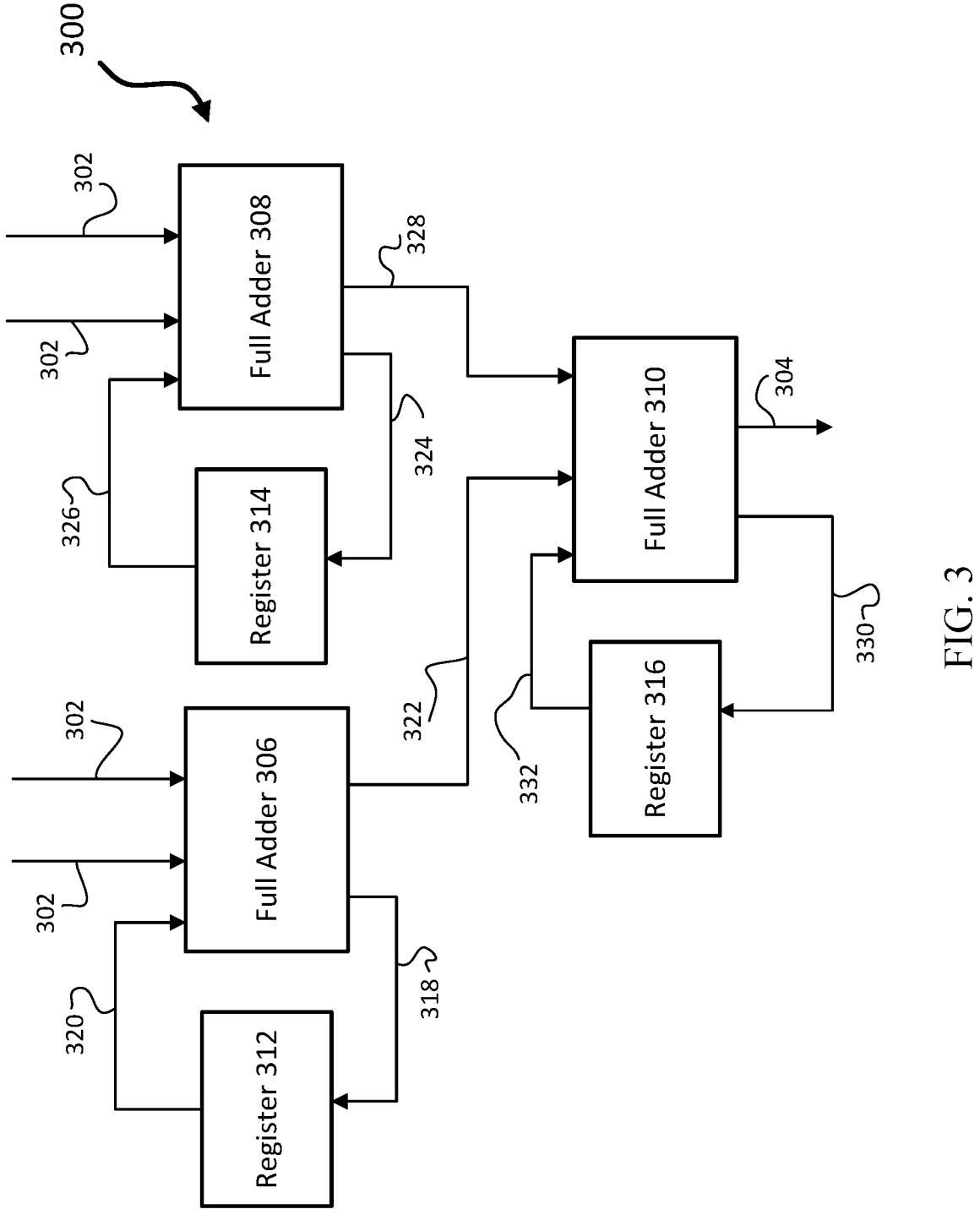
FIG. 3 depicts a block diagram of an example functional unit with four serial inputs and one serial output according to aspects of the disclosure.

FIG. 3 depicts a block diagram of an example functional unit 300 with four serial inputs 302 and one serial output 304. The functional unit 300 includes a first full adder 306, a second full adder 308, a third full adder 310, a first register 312, a second register 314, and a third register 316. In one example, for each full adder, the carry output can be retained in a register to be applied as the carry input to its respective adder in a subsequent cycle. In another example not shown, the carry output of a full adder can be retained in a register to be applied as the carry input to a different full adder.

The first full adder 306 and the third full adder 310 can form a three serial input adder, such as depicted in FIG. 1. The second full adder 308 and the third full adder 310 can also form a three serial input adder.

Two inputs of the first full adder 306 can be two of the four serial inputs 302 and two inputs of the second full adder can be the other two of the four serial inputs 302. A carry output 318 of the first full adder 306 can be retained in the first register 312 to be applied as a carry input 320 of the first full adder 306 in a subsequent cycle. A sum output 322 of the first full adder 306 can be a first input of the three inputs of the third full adder 310. A carry output 324 of the second full adder 308 can be retained in the second register 314 to be applied as a carry input 326 of the second full adder 308 in a subsequent cycle. A sum output 328 of the second full adder 308 can be a second input of the three inputs of the third full adder 310. A carry output 330 of the third full adder 310 can be retained in the third register 316 to be applied as a carry input 332 of the third full adder 310 in a subsequent cycle. A sum output of the third full adder 310 can be the serial output 304 that can output the summation of the four serial inputs 302.

The functional unit 300 with four serial inputs includes two layers of full adders, with a first layer including the first full adder 306 and the second full adder 308 and a second layer including the third full adder 310. While not shown, another example of the functional unit 300 can include three layers having one full adder, with a first layer including the first full adder 306, a second layer including the second full adder 308, and a third layer including the third full adder 310. Here, the sum output 322 of the first full adder 306 can be an input of the second full adder 308 and the sum output 328 of the second full adder 308 can be an input of the third full adder 310. The first full adder 306 can include two of the serial inputs 302, the second full adder 308 can include one of the serial inputs 302, and the third full adder 310 can include the fourth serial input 302.

Figure 4:
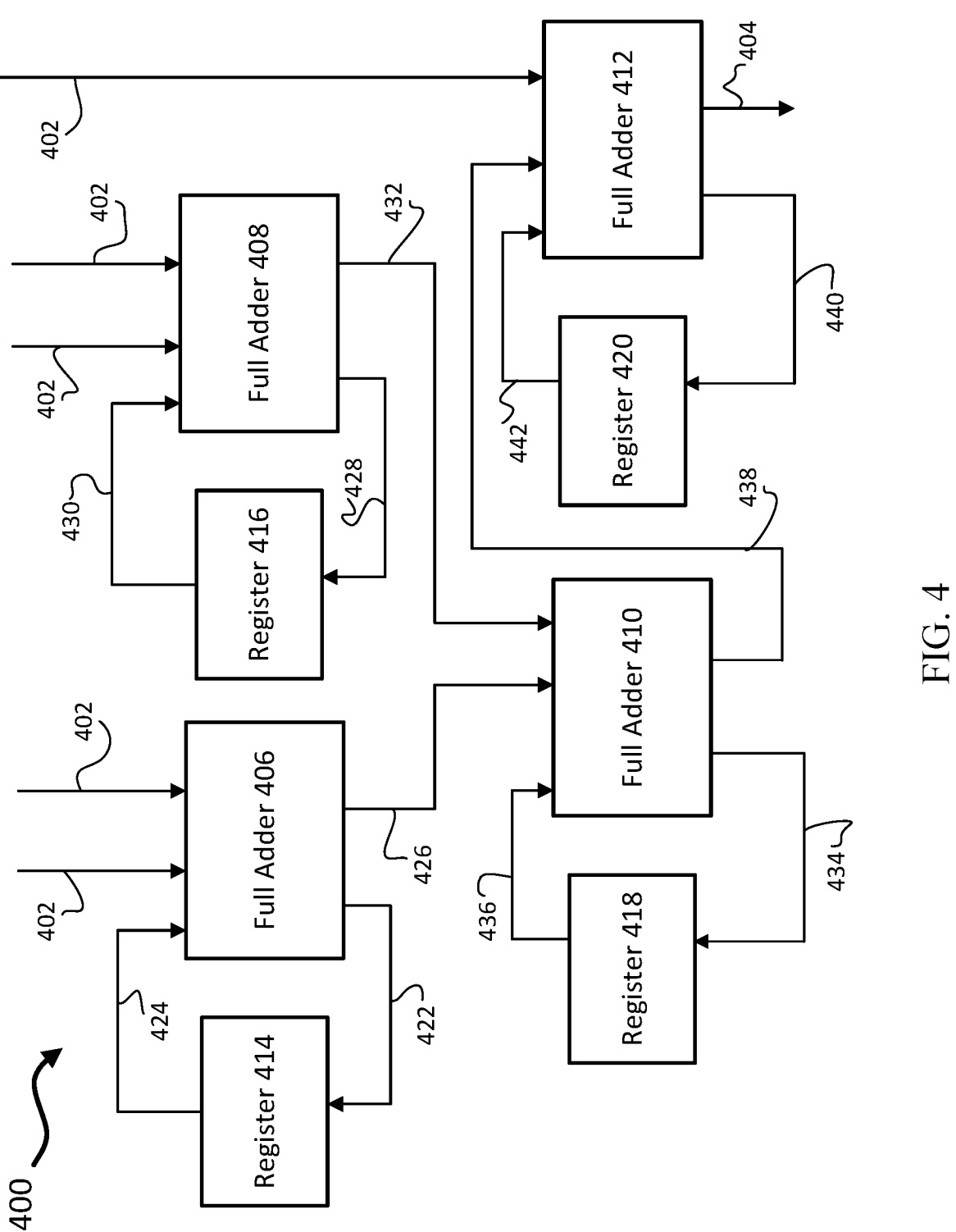
FIG. 4 depicts a block diagram of an example functional unit with five serial inputs and one serial output according to aspects of the disclosure.

FIG. 4 depicts a block diagram of an example functional unit 400 with five serial inputs 402 and one serial output 404. The functional unit 400 includes four full adders 406-412 and four registers 414-420. In one example, for each full adder, the carry output can be retained in a register to be applied as the carry input to its respective adder in a subsequent cycle. In another example not shown, the carry output of a full adder can be retained in a register to be applied as the carry input to a different full adder.

The first full adder 406, second full adder 408, and third full adder 410 can form a four-serial-input adder, such as depicted in FIG. 3. The third full adder 410 and the fourth full adder 412 can form a three-serial-input adder, such as depicted in FIG. 1.

Two inputs of the first full adder 406 can be two of the five serial inputs 402, two inputs of the second full adder 408 can be another two of the five serial inputs 402, and an input of the fourth full adder 412 can be a fifth serial input 402. A carry output 422 of the first full adder 406 can be retained in the first register 414 to be applied as a carry input 424 of the first full adder 406 in a subsequent cycle. A sum output 426 of the first full adder 406 can be a first input of the three inputs of the third full adder 410. A carry output 428 of the second full adder 408 can be retained in the second register 416 to be applied as a carry input 430 of the second full adder 408 in a subsequent cycle. A sum output 432 of the second full adder 408 can be a second input of the three inputs of the third full adder 410. A carry output 434 of the third full adder 410 can be retained in the third register 418 to be applied as a carry input 436 of the third full adder 410 in a subsequent cycle. A sum output 438 of the third full adder 410 can be an input of the three inputs of the fourth full adder 412. A carry output 440 of the fourth full adder 412 can be retained in the fourth register 420 to be applied as a carry input 442 of the fourth full adder 412 in a subsequent cycle. A sum output of the fourth full adder 412 can be the serial output 404 that can output the summation of the five serial inputs 402.

Figure 5:
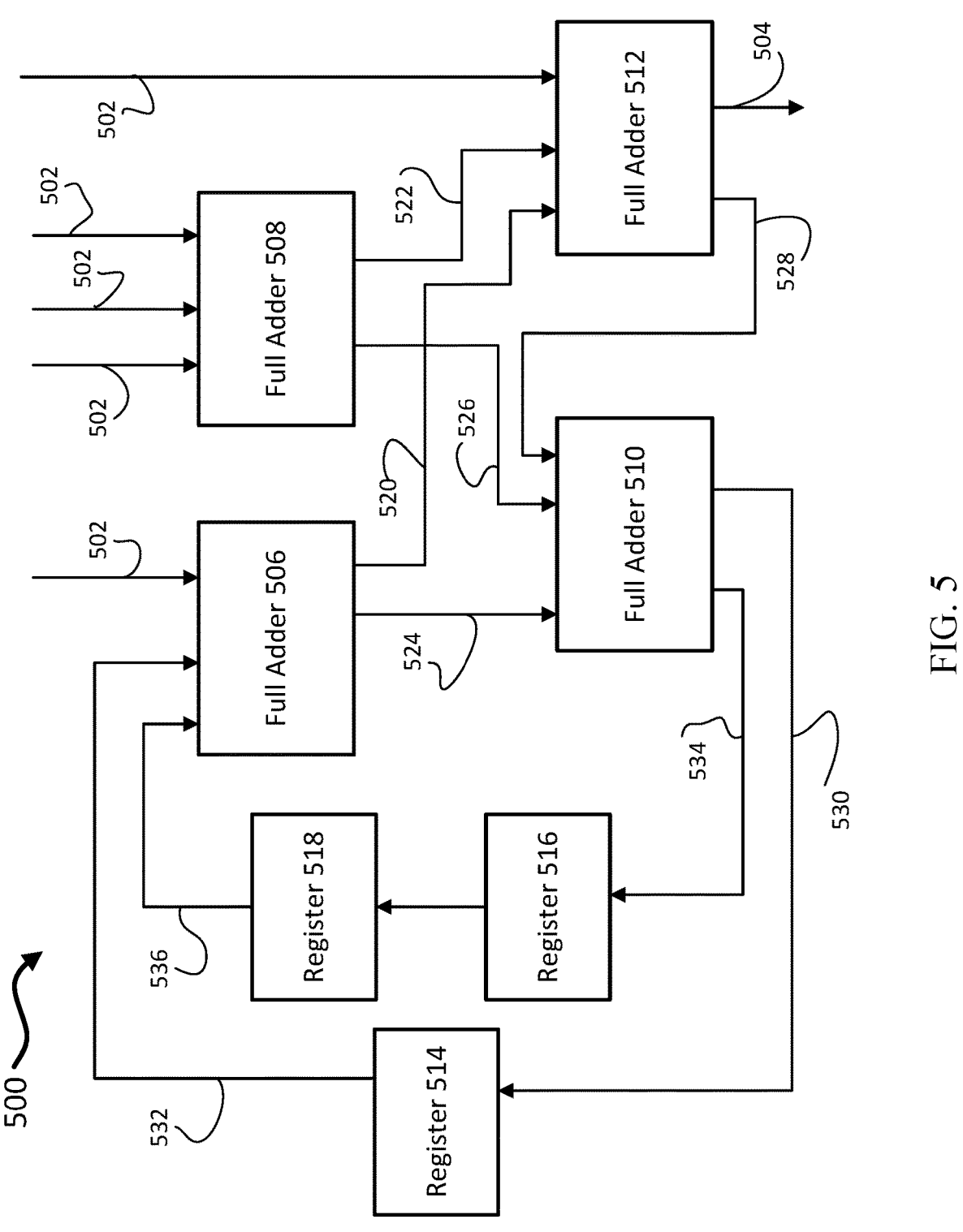
FIG. 5 depicts a block diagram of another example functional unit with five serial inputs and one serial output according to aspects of the disclosure.

FIG. 5 depicts a block diagram of another example functional unit 500 with five serial inputs 502 and one serial output 504. This functional unit 500 has one less register to reduce area. The functional unit 500 includes four full adders 506-512 and three registers 514-518.

An input of the first full adder 506 can be one of the five serial inputs 502, the three inputs of the second full adder 508 can be three of the five serial inputs 502, and an input of the fourth full adder 512 can be the fifth serial input 502. A sum output 520 of the first full adder 506 and the sum output 522 of the second full adder 508 can be two of the inputs of the fourth full adder 512. A carry output 524 of the first full adder 506, a carry output 526 of the second full adder 508, and a carry output 528 of the fourth full adder 512 can be the three inputs of the third full adder 510. A sum output 530 of the third full adder 510 can be retained in the first register 514 to be applied as a first carry input 532 to the first full adder 506 in a subsequent cycle. A carry output 534 of the third full adder 510 can be retained in the second register 516 to be further retained in a third register 518 in a subsequent cycle to then be applied as a second carry input 536 to the first full adder 506 in another subsequent cycle. A sum output of the fourth full adder 512 can be the serial output 504 that can output the summation of the five serial inputs 502.

Figure 6:
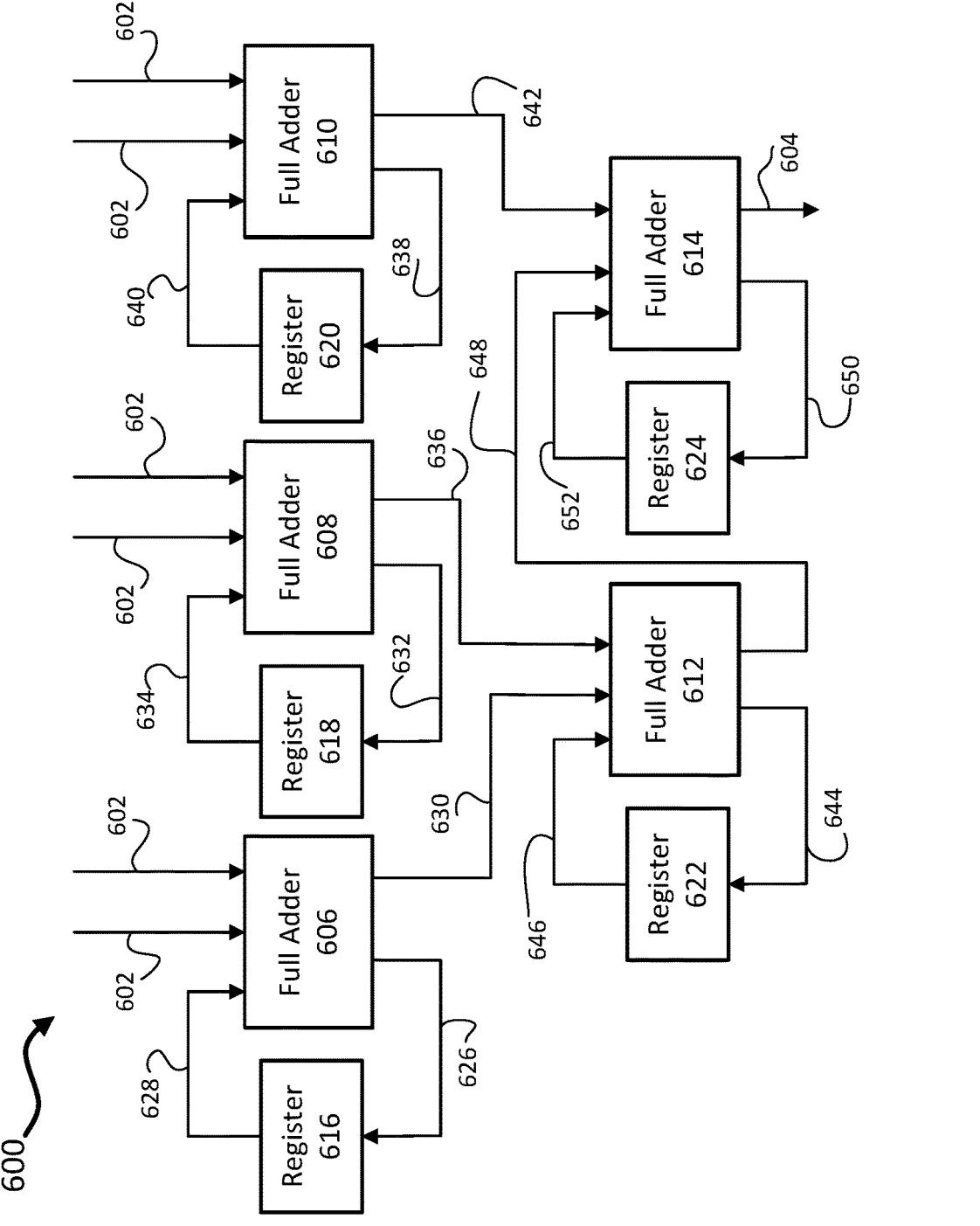
FIG. 6 depicts a block diagram of another example functional unit with six serial inputs and one serial output according to aspects of the disclosure.

FIG. 6 depicts a block diagram of another example functional unit 600 with six serial inputs 602 and one serial output 604. The functional unit 600 includes five full adders 606-614 and five registers 616-624. In one example, for each full adder, the carry output can be retained in a register to be applied as the carry input to its respective adder in a subsequent cycle. In another example not shown, the carry output of a full adder can be retained in a register to be applied as the carry input to a different full adder.

The first full adder 606, second full adder 608, and fourth full adder 612 can form a four serial input adder, such as depicted in FIG. 3. The second full adder 608, fourth full adder 612, and fifth full adder 614 can also form a four serial input adder. The third full adder 610 and fifth full adder 614 can form a three serial input adder, such as depicted in FIG. 1. The fourth full adder 612 and fifth full adder 614 can also form a three serial input adder.

Two inputs of the first full adder 606 can be two of the six serial inputs 602, two inputs of the second full adder 608 can be another two inputs of the six serial inputs 602, and two inputs of the third full adder 610 can be the remaining two inputs of the six serial inputs 602. A carry output 626 of the first full adder 606 can be retained in the first register 616 to be applied as a carry input 628 of the first full adder 606 in a subsequent cycle. A sum output 430 of the first full adder 606 can be a first input of the three inputs of the fourth full adder 612. A carry output 632 of the second full adder 608 can be retained in the second register 618 to be applied as a carry input 634 of the second full adder 608 in a subsequent cycle. A sum output 636 of the second full adder 608 can be a second input of the three inputs of the fourth full adder 612. A carry output 638 of the third full adder 610 can be retained in the third register 620 to be applied as a carry input 640 of the third full adder 610 in a subsequent cycle. A sum output 642 of the third full adder 610 can be a first input of the three inputs of the fifth full adder 614. A carry output 644 of the fourth full adder 612 can be retained in the fourth register 622 to be applied as a carry input 646 of the fourth full adder 612 in a subsequent cycle. A sum output 648 of the fourth full adder 612 can be a second input of the three inputs of the fifth full adder 614. A carry output 650 of the fifth full adder 614 can be retained in the fifth register 624 to be applied as a carry input 652 of the fifth full adder 614 in a subsequent cycle. A sum output of the fifth full adder 614 can be the serial output 604 that can output the summation of the six serial inputs 602.

Figure 7:
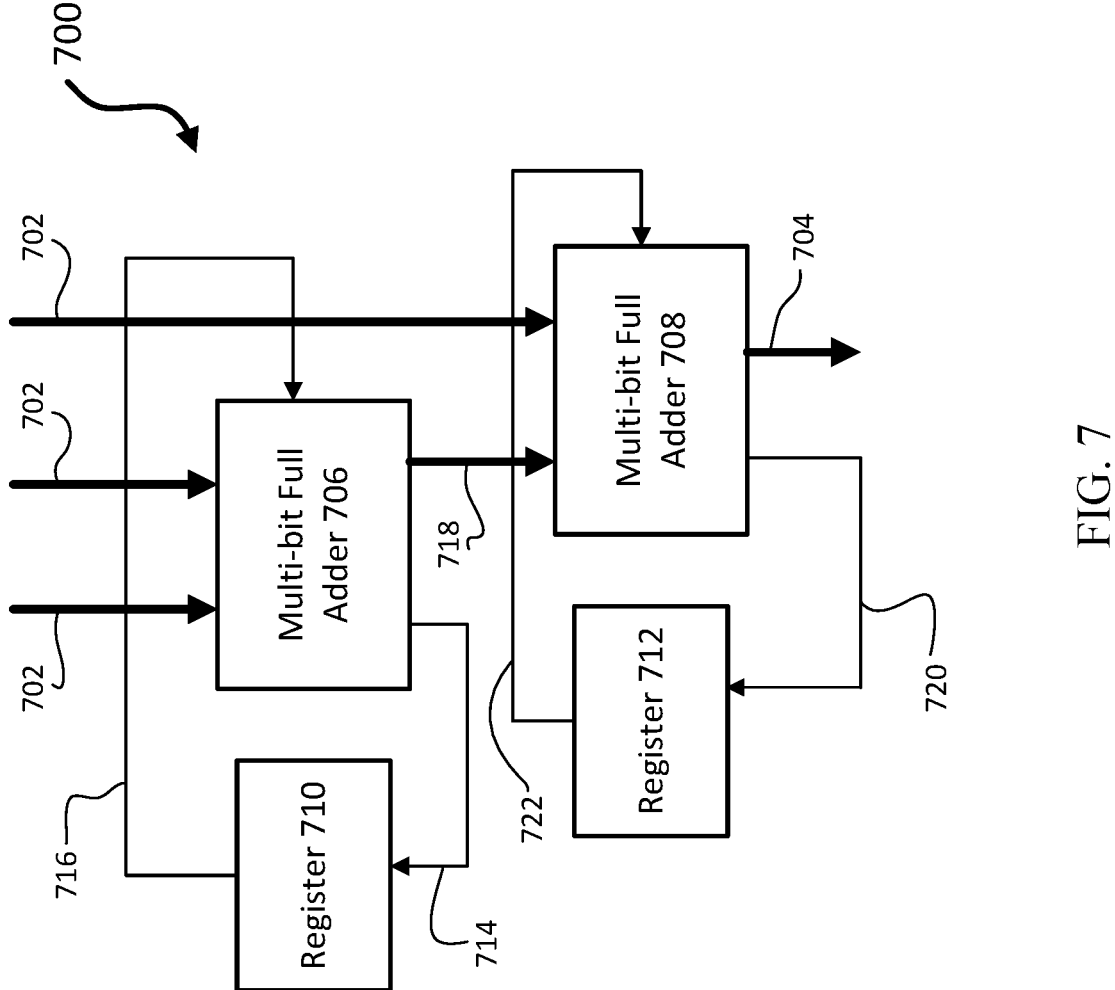
FIG. 7 depicts a block diagram of a functional unit with three multi-bit serial inputs and one multi-bit serial output according to aspects of the disclosure.

The serial inputs and outputs can include multiple bit busses instead of single bits. FIG. 7 depicts a block diagram of a functional unit 700 with three multi-bit serial inputs 702 and one multi-bit serial output 704. The functional unit 700 can include a first multi-bit full adder 706, a second multi-bit full adder 708, a first register 710, and a second register 712. Each multi-bit full adder includes a number of single bit full adders equal to the number of bits of the multi-bit full adder implemented such that each single bit full adder inputs a carry of the previous single bit full adder. An example multi-bit full adder can be a ripple-carry adder.

Two inputs of the first multi-bit full adder 706 can be two of the three multi-bit serial inputs 702 and an input of the second multi-bit full adder 708 can be the third multi-bit serial input 702. A carry output 714 of the first multi-bit full adder 706 can be retained in the first register 710 to be applied as a carry input 716 of the first multi-bit full adder 706 in a subsequent cycle. A multi-bit sum output 718 of the first multi-bit full adder 706 can be an input of the second multi-bit full adder 708. A carry output 720 of the second multi-bit full adder 708 can be retained in the second register 712 to be applied as a carry input 722 of the second multi-bit full adder 708 in a subsequent cycle. A multi-bit sum output of the second multi-bit full adder 708 can be the multi-bit serial output 704 that can output the summation of the three multi-bit serial inputs 702.

Just as with the single bit examples, a functional unit can include any number of multi-bit serial inputs greater than two and one multi-bit serial output. The number of multi-bit full adders in the functional unit can be one less than the number of multi-bit serial inputs. The number of registers in the functional unit can be less than the number of multi-bit serial inputs. The number of layers of full adders can be at most equal to the number of full adders in the functional unit.

Functional units can be incorporated into a processing unit of a programmable device to allow for construction of various functions. As an example, the programmable device can include one or more processing units and a programmable interconnect, where the processing units can include one or more functional units, such as one of the example functional units described above.

Figure 8:
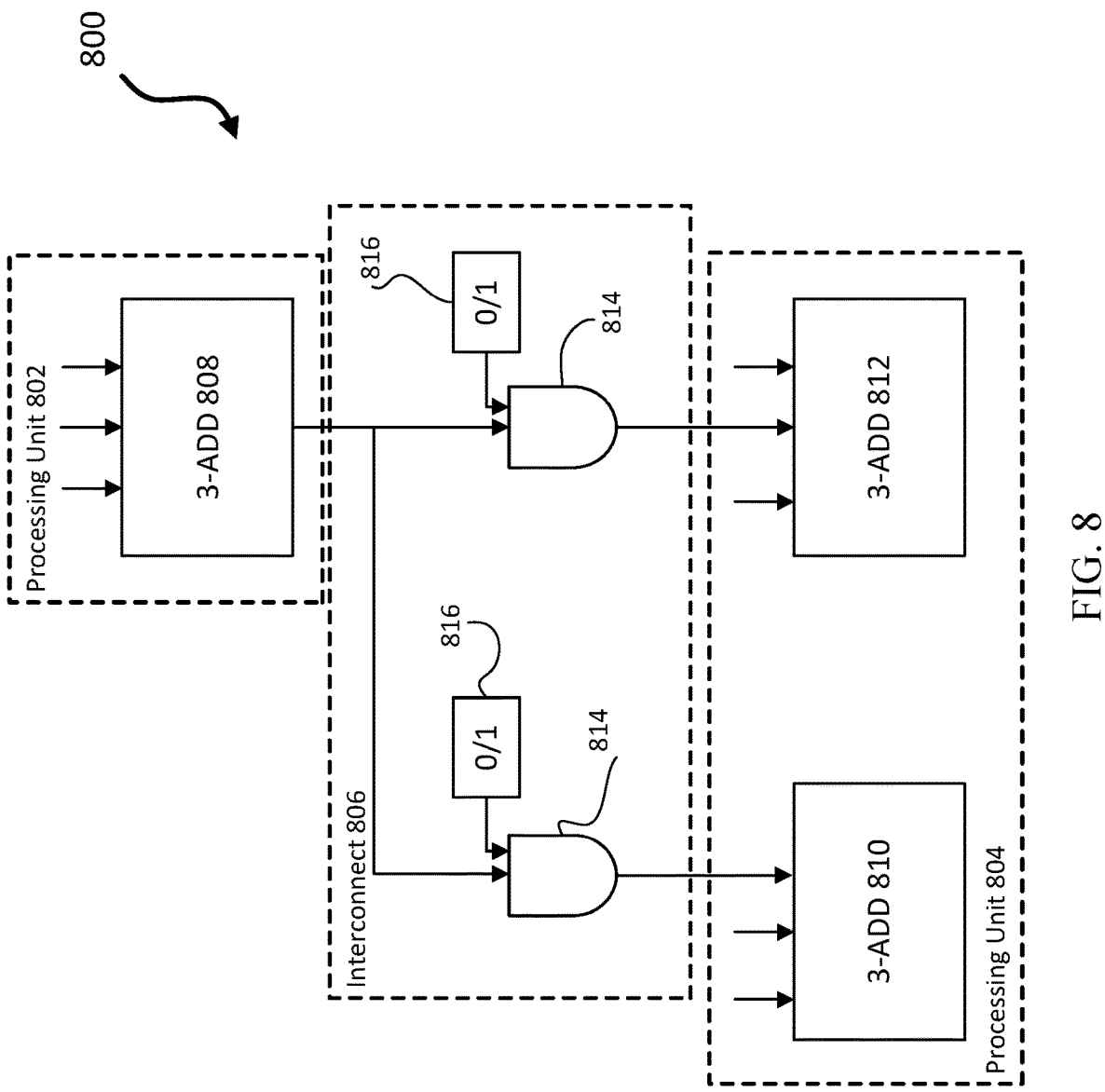
FIG. 8 depicts a block diagram of an example programmable device that includes a programmable interconnect for masking bits according to aspects of the disclosure.

FIG. 8 depicts a block diagram of an example programmable device 800 that includes a programmable interconnect for masking bits. The programmable device 800 can include a first processing unit 802 and a second processing unit 804 connected by a programmable interconnect 806 for masking bits. It should be noted that the first processing unit 802 and the second processing unit 804 can be part of the same processing unit or separate processing units.

The first processing unit 802 can include a first functional unit 808 and the second processing unit 804 can include a second functional unit 810 and a third functional unit 812. While the second functional unit 810 and third functional unit 812 are depicted in the same processing unit, it should be noted that the functional units can also be part of separate processing units. Here, the functional units correspond to functional units with three serial inputs, such as depicted in FIG. 1 or 2. However, the functional units can correspond to any of the examples provided herein or other examples not shown. Each functional unit can be the same or differ as well. For example, while only three serial input functional units are depicted for simplicity, in another implementation, the first functional unit 808 could be a five-serial-input functional unit while the second functional unit 810 could be a three-serial-input functional unit and the third functional unit 812 could be a six-serial-input functional unit. Each processing unit can also include any number of functional units.

The programmable interconnect 806 can be connected between a sum output of the first functional unit 808 and an input of the second functional unit 810 and third functional unit 812. The programmable interconnect 806 can be connected to any input of the three inputs of the second and third functional units 810, 812. The programmable interconnect 806 can include logic gates 814 for masking bits to zero or one, such as AND gates. The logic gates 814 can be input with configuration bits 816 for masking bits to zero or one. The sum output of the first functional unit 808 can be masked by the programmable interconnect 806 and the masked sum can be input to the second functional unit 810 and third functional unit 812.

Figure 9:
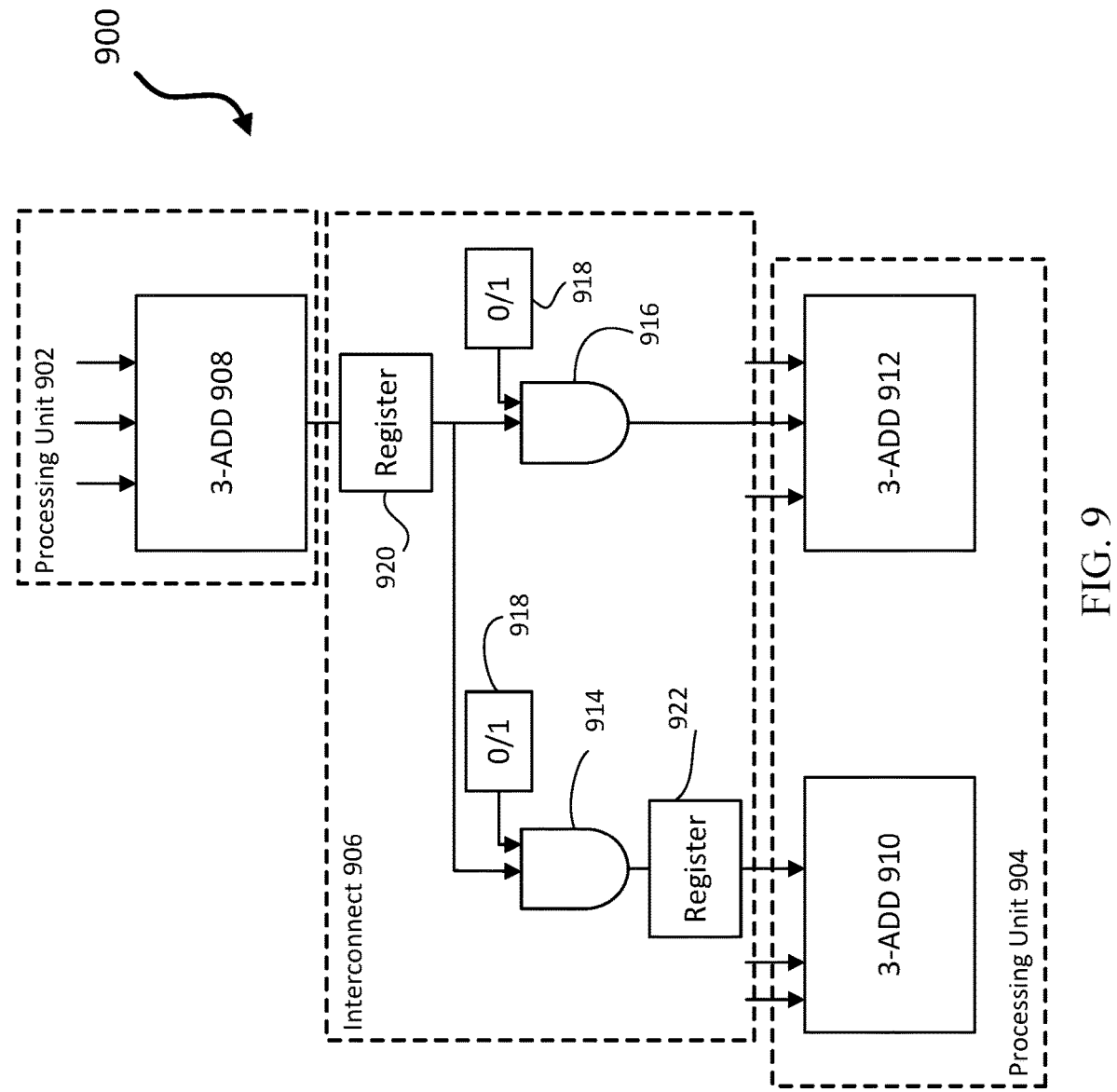
FIG. 9 depicts a block diagram of an example programmable device that includes registers in the programmable interconnect for masking bits according to aspects of the disclosure.

FIG. 9 depicts a block diagram of an example programmable device 900 that includes registers. The registers can add delay to enable a higher clock rate. The delay can correspond to a multiplication of two. Therefore, registers can be included at some outputs of the programmable interconnect to produce different results.

The programmable device 900 can include a first processing unit 902 and a second processing unit 904 connected by a programmable interconnect 906 for masking bits. The first processing unit 902 can include a first functional unit 908 and the second processing unit 904 can include a second functional unit 910 and a third functional unit 912. As with FIG. 8, the functional units here correspond to functional units with three serial inputs for example purposes only. The number of functional units depicted are for example purposes only as well.

The programmable interconnect 906 can be connected between a sum output of the first functional unit 908 and an input of the second functional unit 910 and third functional unit 912. The programmable interconnect 906 can include a first logic gate 914 and a second logic gate 916 for masking bits to zero or one. The logic gates 914, 916 can be input with configuration bits 918 for masking bits to zero or one. The programmable interconnect 906 further can include a first register 920 and a second register 922 for retaining bits for a cycle. The first register 920 can be connected between the sum output of the first functional unit 908 and the logic gates 914, 916. The second register 922 can be connected between the output of the first logic gate 914 and an input of the second functional unit 910.

The sum output of the first functional unit 908 can be retained in the first register 920 for a cycle. The output of the first register 920 can be masked by the first and second logic gates 914, 916. The masked output of the first logic gate 914 can be retained in the second register 922 for a cycle and can be input to the second functional unit 910. The masked output of the second logic gate 916 can be input to the third functional unit 912. Because of the second register 922, the second functional unit 910 and third functional unit 912 can have different inputs derived from the output of the first functional unit 908.

Figure 10:
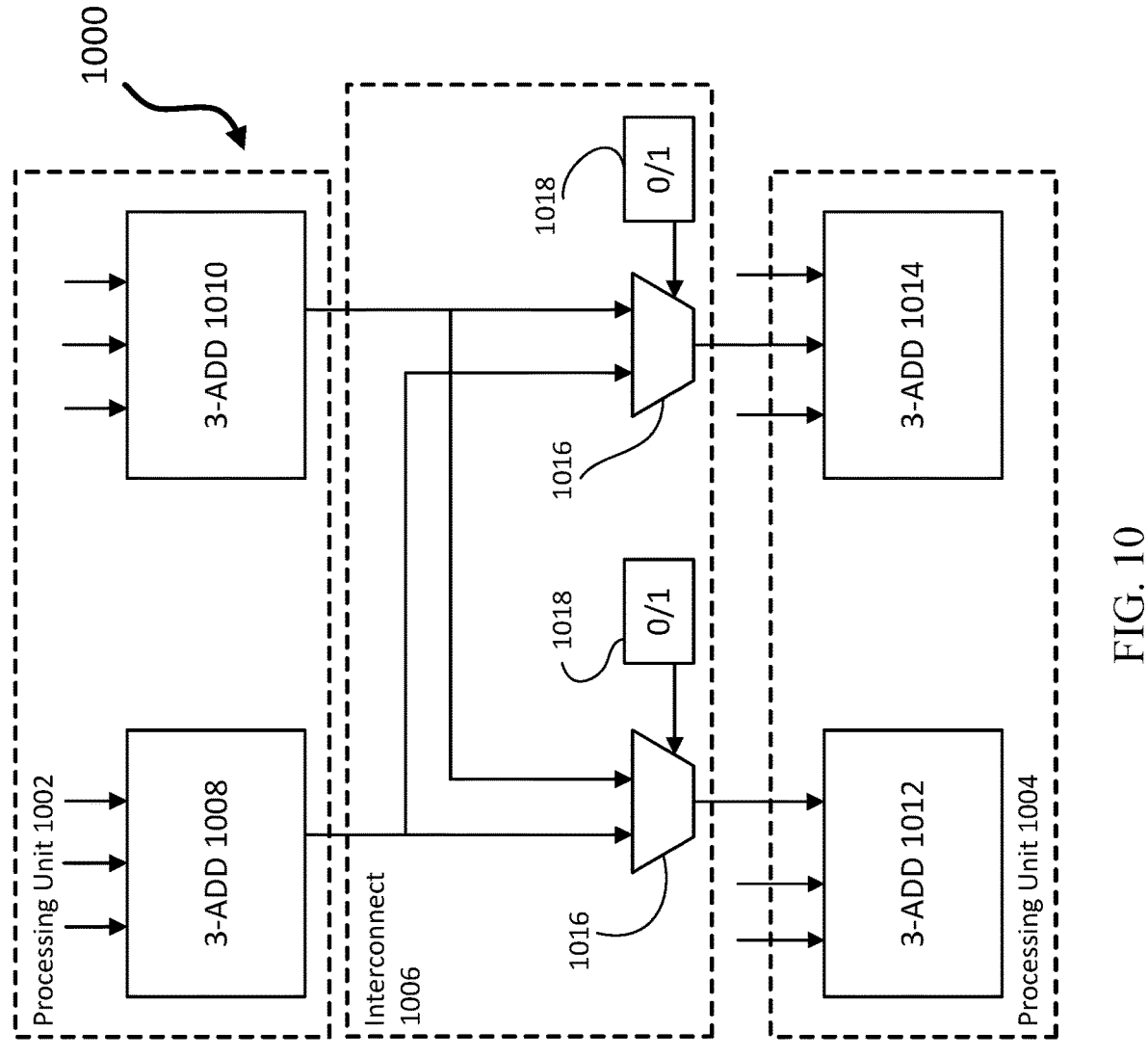
FIG. 10 depicts a block diagram of an example programmable device that includes a programmable interconnect for multiplexing according to aspects of the disclosure.

FIG. 10 depicts a block diagram of an example programmable device 1000 that includes a programmable interconnect for multiplexing. The programmable device 1000 can include a first processing unit 1002 and a second processing unit 1004 connected by a programmable interconnect 1006. The first processing unit 1002 can include a first functional unit 1008 and a second functional unit 1010 and the second processing unit 1004 can include a third functional unit 1012 and a fourth functional unit 1014. As with the previous figures, the functional units here correspond to functional units with three serial inputs for example purposes only. The number of functional units depicted are for example purposes only as well.

The programmable interconnect 1006 can be connected between sum outputs of the first and second functional units 1008, 1010 and inputs of the third and fourth functional units 1012, 1014. The programmable interconnect 1006 can include a number of multiplexers 1016 for selecting which sum outputs of the first and second functional units 1008, 1010 are provided to which inputs of the third and fourth functional units 1012, 1014. The multiplexers 1016 can be input with a configuration bit 1018 for selecting which sum output. The selected sum output can be input to its corresponding functional unit. While the multiplexers 1016 are shown with two inputs, they can include any number of inputs. While not shown, registers can be included between components for adding delay or providing a different output.

Figure 11:
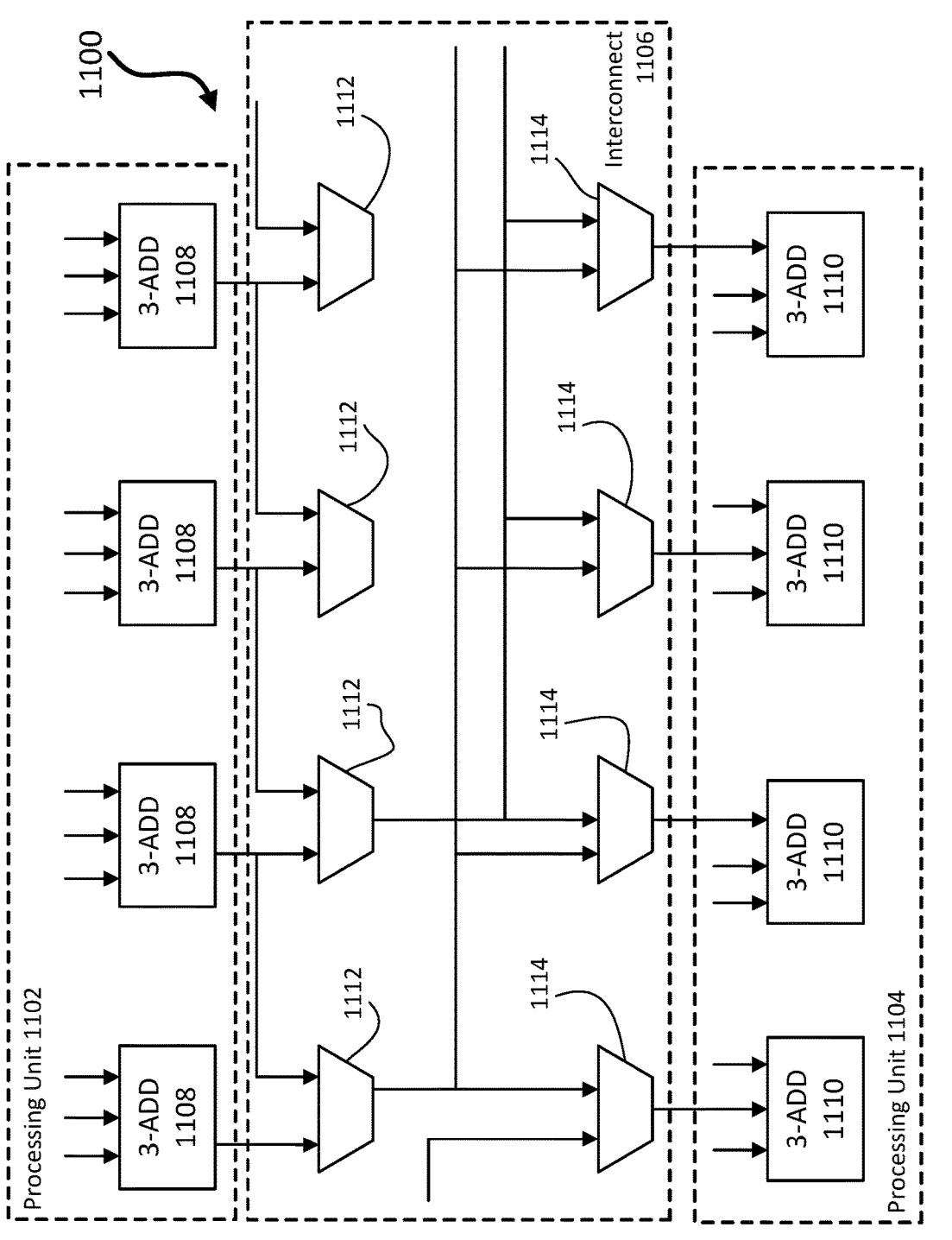
FIG. 11 depicts a block diagram of an example programmable device that includes a programmable interconnect for multi-layered multiplexing according to aspects of the disclosure.

FIG. 11 depicts a block diagram of an example programmable device 1100 that includes a programmable interconnect for multi-layered multiplexing where multiplexers can be connected to other multiplexers. The programmable device 1100 can include a first processing unit 1102 and a second processing unit 1104 connected by a programmable interconnect 1106. The first processing unit 1102 can include a first plurality of functional units 1108 and the second processing unit 1104 can include a second plurality of functional units 1110. As with the previous figures, the functional units here correspond to functional units with three serial inputs for example purposes only. The number of functional units depicted are for example purposes only as well.

The programmable interconnect 1106 can be connected between sum outputs of the first plurality of functional units 1108 and inputs of the second plurality of functional units 1110. The programmable interconnect 1106 can include a first plurality of multiplexers 1112 for selecting which sum outputs of the first plurality of functional units 1108 are provided to which multiplexers of a second plurality of multiplexers 1114, which further selects which input of the second plurality of functional units 1110 to which the sum outputs are provided. While two layers of multiplexers are shown for simplicity, it should be noted any number of layers of multiplexers, each having any number of multiplexers, can be included in the programmable interconnect 1106. Further, while not shown, registers can be included between components for adding delay or providing a different output. The multi-layered multiplexing with the functional units can allow for an efficient use of inputs on a programmable device.

Figure 12:
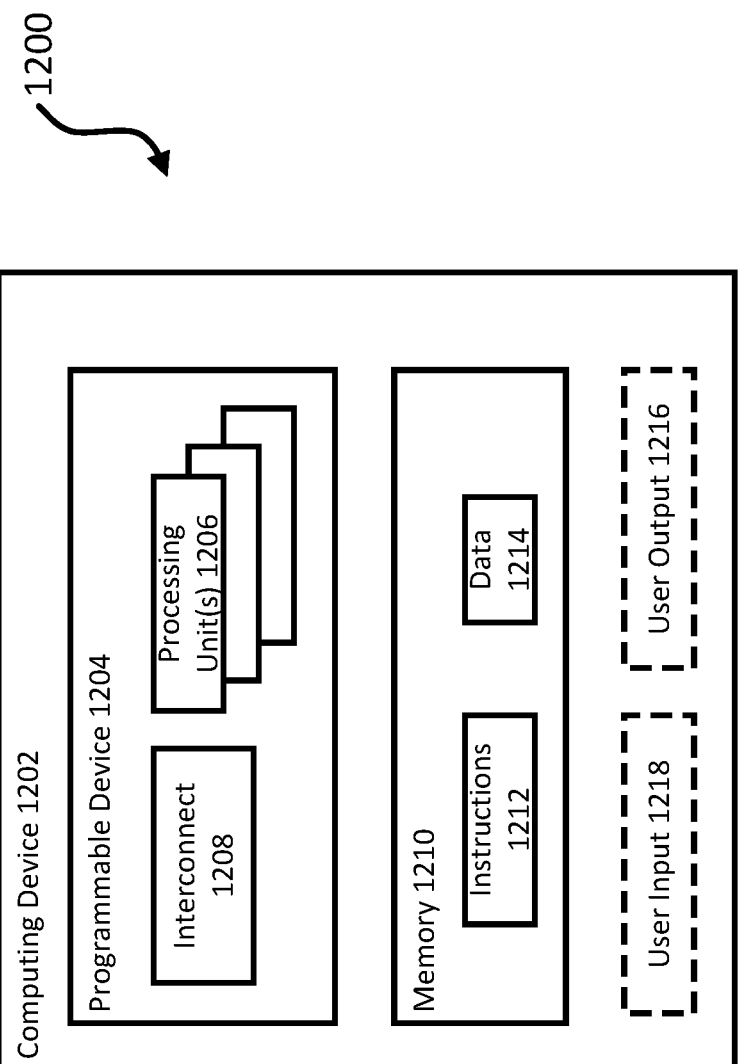
FIG. 12 depicts a block diagram of an example environment for implementing the functional units and/or programmable devices according to aspects of the disclosure.

FIG. 12 depicts a block diagram of an example environment 1200 for implementing the functional units and/or programmable devices. The system 1200 can be implemented on one or more computing devices 1202 in one or more locations, such as in a server or client computing device. The computing device 1202 can include one or more programmable devices 1204 having one or more processing units 1206 connected by a programmable interconnect 1208. The programmable device 1204 can include one or more central processing units (CPUs), graphic processing units (GPUs), field-programmable gate arrays (FPGAs), and/or application-specific integrated circuits (ASICs), such as tensor processing units (TPUs). The processing units 1206 can include one or more functional units, such as depicted in the previous examples. The programmable interconnect 1208 can functionally and/or physically connect the processing units 1206, such as with logic units or multiplexers as depicted in the previous examples.

The computing device 1202 can further include memory 1210 that can store information accessible by the programmable device 1204, including instructions 1212 that can be executed by the programmable device 1204. The memory 1210 can also include data 1214 that can be retrieved, manipulated, or stored by the programmable device 1204. The memory 1210 can be a type of non-transitory computer readable medium capable of storing information accessible by the programmable device 1204, such as volatile and non-volatile memory.

The instructions 1212 can include one or more instructions that, when executed by the programmable device 1204, causes the programmable device 1204 to perform actions defined by the instructions 1212. The instructions 1212 can be stored in object code format for direct processing by the programmable device 1204, or in other formats including interpretable scripts or collections of independent source code modules that are interpreted on demand or compiled in advance.

The data 1214 can be retrieved, stored, or modified by the programmable device 1204 in accordance with the instructions 1212. The data 1214 can be stored in computer registers, in a relational or non-relational database as a table having a plurality of different fields and records, or as JSON, YAML, proto, or XML documents. The data 1214 can also be formatted in a computer-readable format such as, but not limited to, binary values, ASCII or Unicode. Moreover, the data 1214 can include information sufficient to identify relevant information, such as numbers, descriptive text, proprietary codes, pointers, references to data stored in other memories, including other network locations, or information that is used by a function to calculate relevant data.

If the computing device 1202 is a client computing device, the computing device 1202 can also include a user output 1216 and a user input 1218. The user output 1216 can be configured for displaying an interface and/or include one or more speakers, transducers or other audio outputs, a haptic interface or other tactile feedback that provides non-visual and non-audible information to a user of the computing device 1202. The user input 1218 can include any appropriate mechanism or technique for receiving input from a user, such as keyboard, mouse, mechanical actuators, soft actuators, touchscreens, microphones, and sensors.

Although FIG. 12 illustrates the programmable device 1204 and the memory 1210 as being within the computing device 1202, components described in this specification can include multiple programmable devices 1204 and memories that can operate in different physical locations and not within the same computing device. For example, some of the instructions 1212 and the data 1214 can be stored on a removable SD card and others within a read-only computer chip. Some or all of the instructions 1212 and data 1214 can be stored in a location physically remote from, yet still accessible by, the programmable device 1204. Similarly, the programmable device 1204 can include a collection of processing units that can perform concurrent and/or sequential operations. The computing device 1202 can include one or more internal clocks providing timing information, which can be used for time measurement for operations and programs run by the computing device 1202.

As such, generally disclosed herein are implementations for a functional unit that can accumulate more than two serial inputs and provide one serial summation output. The serial inputs and outputs can be single bits or multiple bit busses. The functional unit can be implemented as a logical tree, where any two points are connected by one path. The functional unit can be incorporated into a processing unit of a programmable device to allow for construction of various functions.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A programmable device, comprising:
a first processing unit, a second processing unit, and a programmable interconnect, wherein the first processing unit and the second processing unit are connected to the programmable interconnect;
the first processing unit and the second processing unit each comprising a plurality of full adder circuits configured to collectively receive at least three serial inputs and produce a single serial output that is a summation of the at least three serial inputs, wherein a carried state is maintained among the plurality of full adder circuits;

the programmable interconnect being connected between the first processing unit and the second processing unit and comprising a logic gate, wherein the programmable interconnect is configured to receive, from the plurality of full adder circuits of the first processing unit, the single serial output and output, to the plurality of full adder circuits of the second processing unit, at least one of the three serial inputs for the second processing unit based on the logic gate.

2. The programmable device of claim 1, wherein a number of inputs of the processing units are equal to one more than the number of full adder circuits of the plurality.

3. The programmable device of claim 1, wherein each serial input is a multiple bit input.

4. The programmable device of claim 1, wherein each full adder circuit comprises three single bit inputs, a sum output, and a carry output.

5. The programmable device of claim 4, wherein the sum output of one of the plurality of full adder circuits is an input of another full adder circuit.

6. The programmable device of claim 4, wherein the carry output of one of the plurality of full adder circuits is retained in a register to be applied as a carry input of the full adder circuit in a subsequent cycle.

7. The programmable device of claim 4, wherein the carry output of one of the plurality of full adder circuits is an input of another full adder circuit.

8. The programmable device of claim 1, wherein the programmable interconnect further comprises a multiplexer.

9. The programmable device of claim 1, wherein the programmable interconnect further comprises one or more registers.

10. A method for operating a programmable device, the programmable device comprising a first processing unit and a second processing unit coupled to a programmable interconnect, the first processing unit and second processing unit each comprising a plurality of full adder circuits and the programmable interconnect being connected between the first processing unit and the second processing unit and comprising a logic gate, the method comprising:

collectively receiving, with the plurality of full adder circuits, at least three serial inputs;

producing, with the plurality of full adder circuits, a single serial output that is a summation of the at least three serial inputs;

maintaining a carried state among the plurality of full adder circuits;

receiving, from the plurality of full adder circuits of the first processing unit, the single serial output; and outputting, to the plurality of full adder circuits of the second processing unit, at least one of the three serial inputs for the second processing unit based on the logic gate.

11. The method of claim 10, wherein a number of inputs of the processing units are equal to one more than the number of full adder circuits of the plurality.

12. The method of claim 10, wherein each full adder circuit comprises three single bit inputs, a sum output, and a carry output.

13. The method of claim 12, further comprising inputting the sum output of one of the plurality of full adder circuits to another full adder circuit.

14. The method of claim 12, further comprising retaining the carry output of one of the plurality of full adder circuits in a register to be applied as a carry input of the full adder circuit in a subsequent cycle.

15. The method of claim 12, further comprising inputting the carry output of one of the plurality of full adder circuits to another full adder circuit.

16. A non-transitory computer readable medium for storing instructions that, when executed by a programmable device, the programmable device comprising a first processing unit and a second processing unit coupled to a programmable interconnect, the first processing unit and second processing unit each comprising a plurality of full adder circuits and the programmable interconnect being connected between the first processing unit and the second processing unit and comprising a logic gate, causes the programmable device to perform operations comprising:

collectively receiving, with a plurality of full adder circuits, at least three serial inputs;

producing, with the plurality of full adder circuits, a single serial output that is a summation of the at least three serial inputs;

maintaining a carried state among the plurality of full adder circuits;

receiving, from the plurality of full adder circuits of the first processing unit, the single serial output; and outputting, to the plurality of full adder circuits of the second processing unit, at least one of the three serial inputs for the second processing unit based on the logic gate.

17. The non-transitory computer readable medium of claim 16, wherein the operations further comprise inputting a sum output of one of the plurality of full adder circuits to another full adder circuit.

18. The non-transitory computer readable medium of claim 16, wherein the operations further comprise retaining a carry output of one of the plurality of full adder circuits in a register to be applied as a carry input of the full adder circuit in a subsequent cycle.

19. The non-transitory computer readable medium of claim 16, wherein the operations further comprise inputting a carry output of one of the plurality of full adder circuits to another full adder circuit.

20. The non-transitory computer readable medium of claim 16, wherein the at least three serial inputs are collectively received based on a number of registers in the programmable interconnect.

* * * * *